June 1, 1937.  R. B. McKINLEY  2,082,168
POWER SUPPLY UNIT
Filed March 8, 1935  10 Sheets-Sheet 2

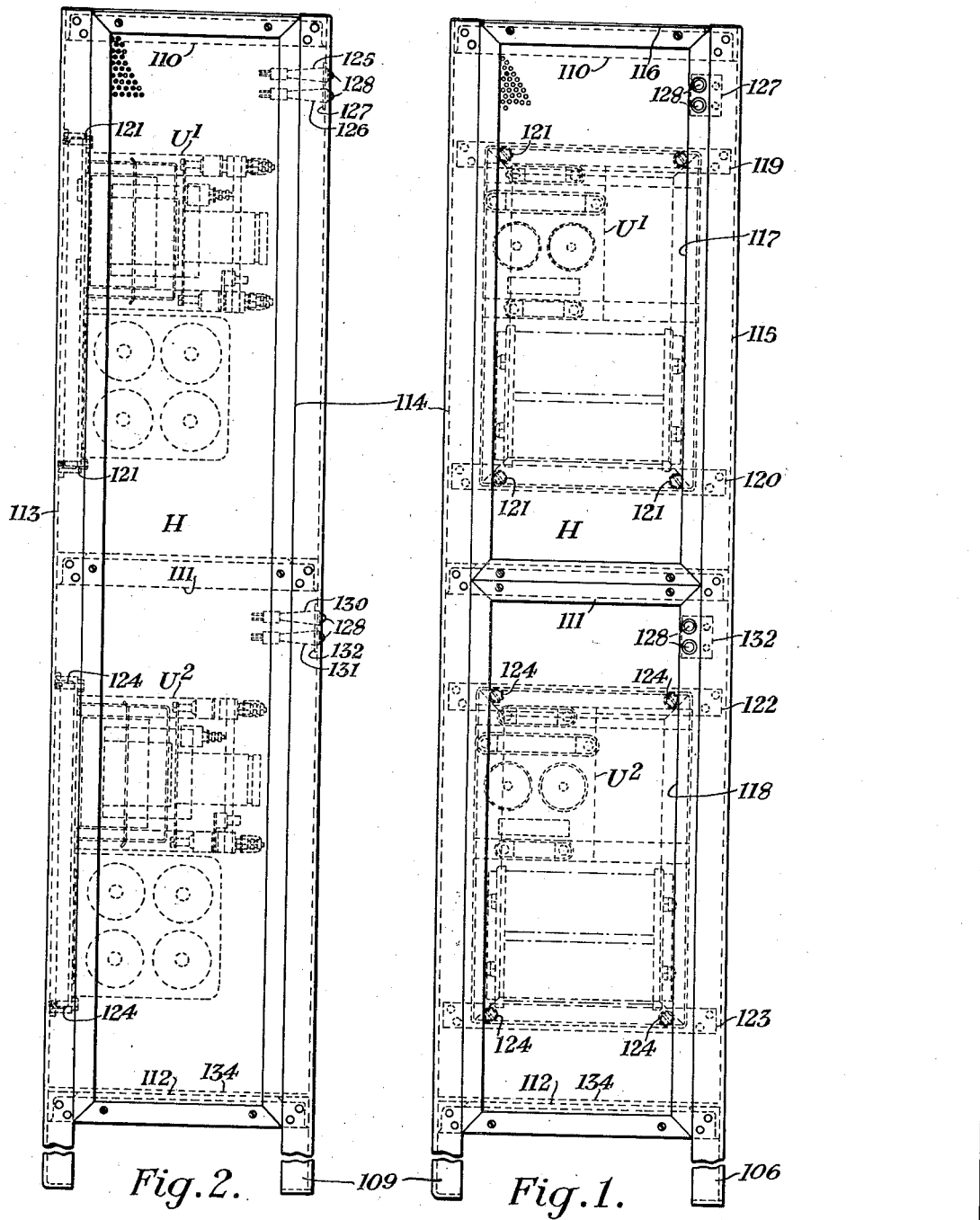

INVENTOR
Reid B. McKinley.
BY
HIS ATTORNEY

June 1, 1937.  R. B. McKINLEY  2,082,168
POWER SUPPLY UNIT
Filed March 8, 1935  10 Sheets—Sheet 3

INVENTOR
Reid B. McKinley.
BY
HIS ATTORNEY

INVENTOR
Reid B. McKinley
BY
HIS ATTORNEY

June 1, 1937.   R. B. McKINLEY   2,082,168
POWER SUPPLY UNIT
Filed March 8, 1935   10 Sheets-Sheet 5

INVENTOR
Reid B. McKinley.
BY
HIS ATTORNEY

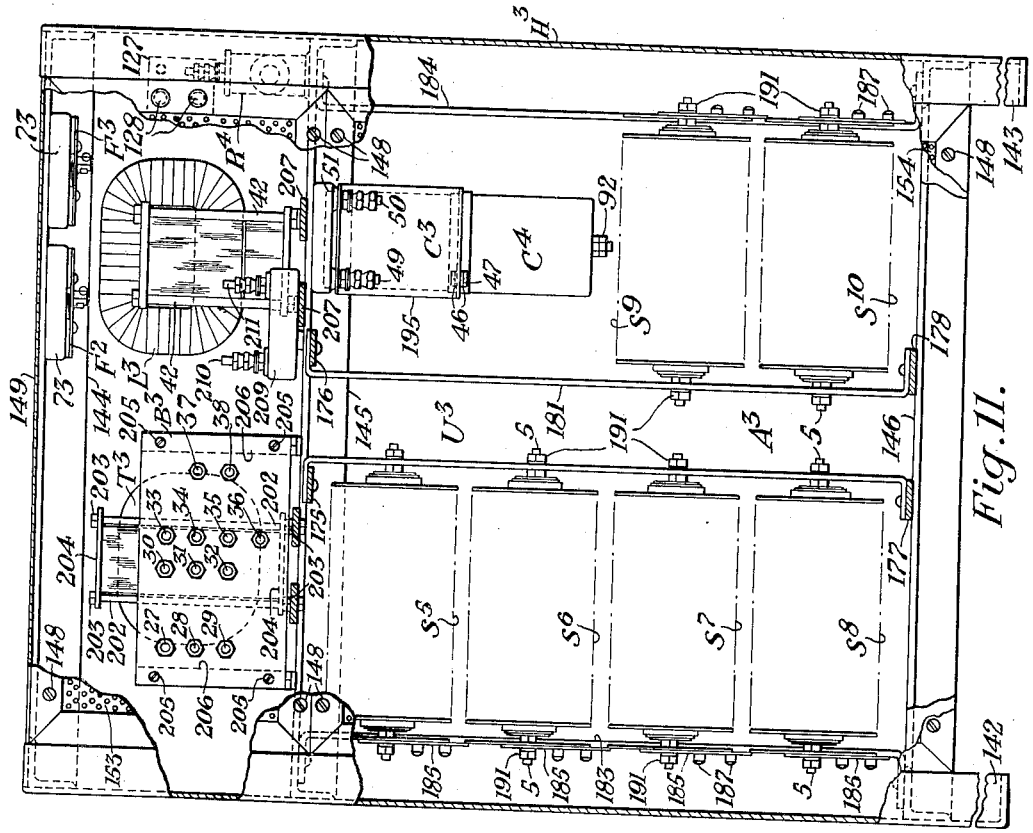
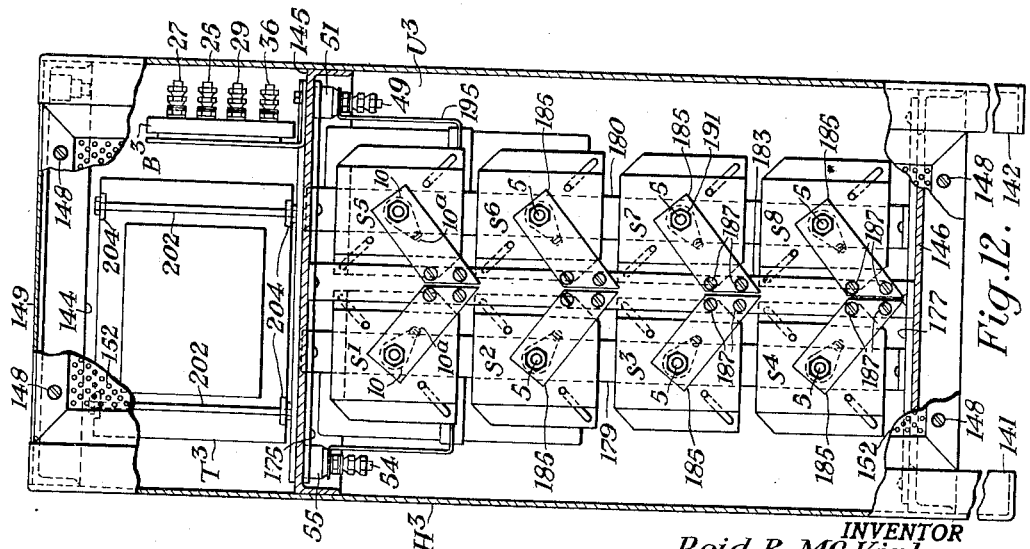

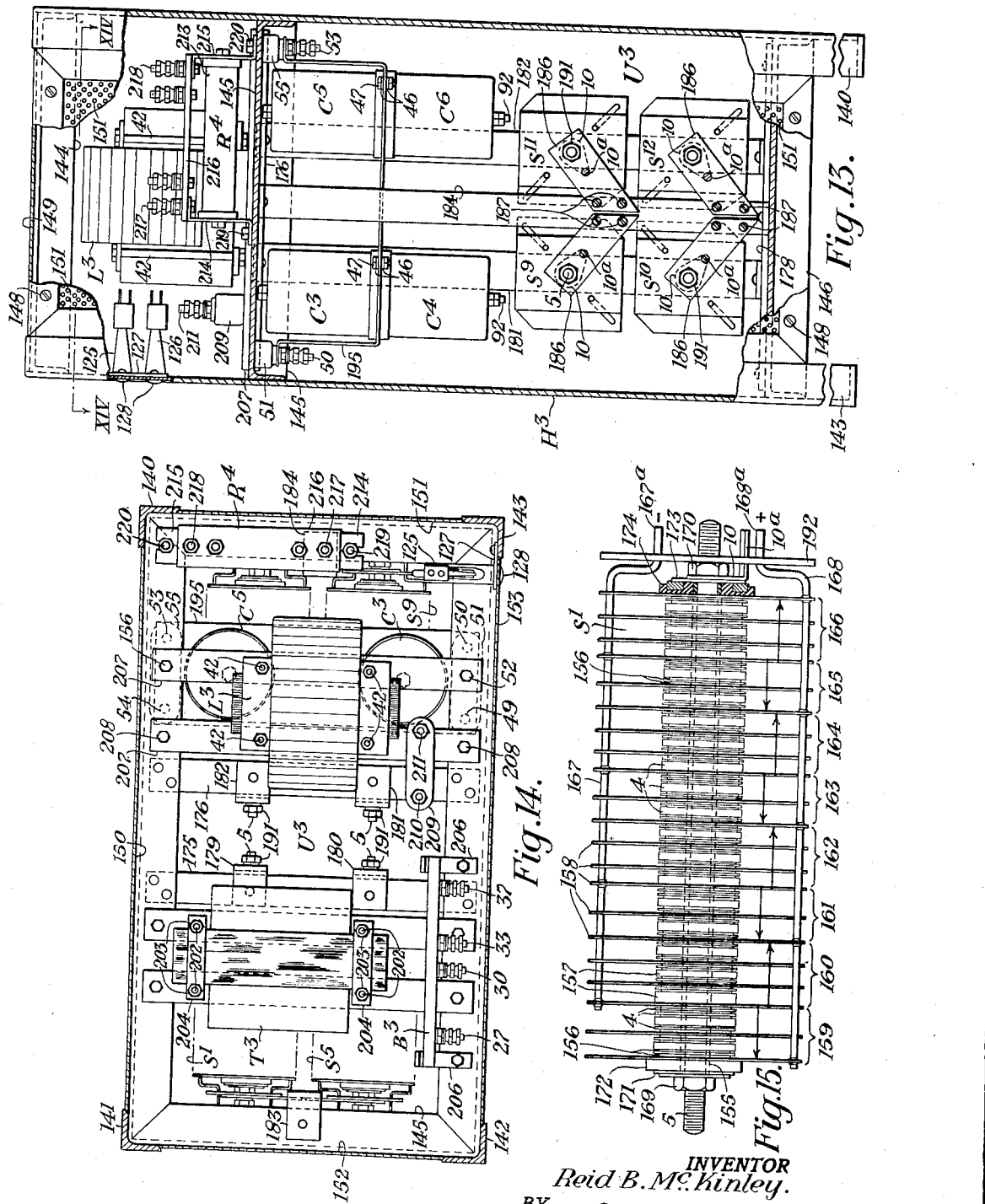

June 1, 1937.   R. B. McKINLEY   2,082,168
POWER SUPPLY UNIT
Filed March 8, 1935   10 Sheets-Sheet 8

INVENTOR
Reid B. McKinley.
BY
HIS ATTORNEY

June 1, 1937.  R. B. McKINLEY  2,082,168
POWER SUPPLY UNIT
Filed March 8, 1935  10 Sheets-Sheet 9
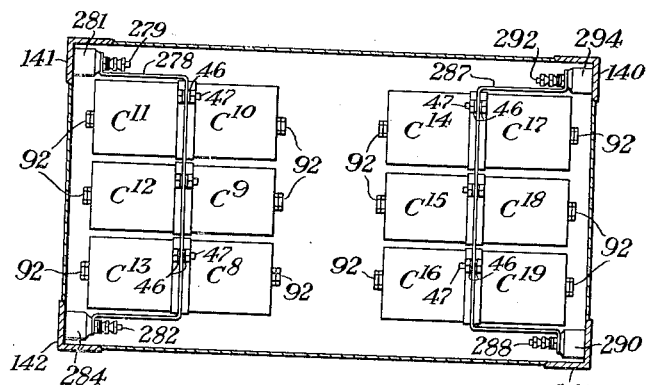
Fig.20.
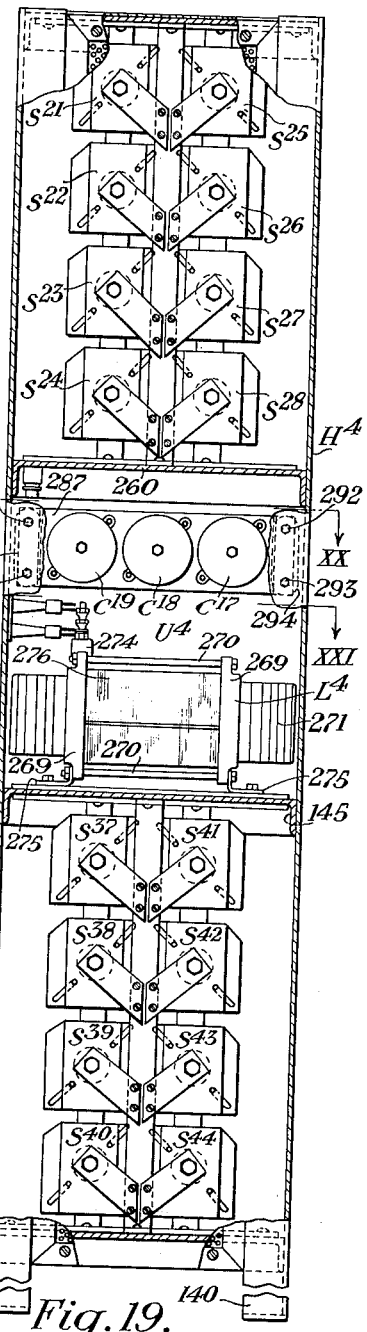
Fig.21.
Fig.19.
INVENTOR
Reid B. McKinley.
BY
HIS ATTORNEY June 1, 1937. R. B. McKINLEY 2,082,168
POWER SUPPLY UNIT
Filed March 8, 1935 10 Sheets-Sheet 10

INVENTOR
Reid B. McKinley
BY
HIS ATTORNEY

Patented June 1, 1937

2,082,168

UNITED STATES PATENT OFFICE 2,082,168

POWER SUPPLY UNIT

Reid B. McKinley, Swissvale, Pa., assignor to The Union Switch & Signal Company, Swissvale, Pa., a corporation of Pennsylvania Application March 8, 1935, Serial No. 10,087

10 Claims. (Cl. 175—363)

My invention relates to power supply units, and particularly to units which may be used in place of storage batteries as a source of substantially constant direct current for operating telephone exchanges, the relays and other devices included in centralized traffic control systems for railroads, lights, motors, and the like. More particularly, my present invention relates to units of the type described in which alternating current from a suitable source, after being stepped up or stepped down by a transformer to the proper potential for rectification, is rectified by asymmetric units of the copper oxide or dry disk type, and is then filtered by suitable filtering means.

One object of my invention is to provide a convenient self-contained unit of the type described which is not only compact and economical to manufacture but which is readily accessible for inspection, test, maintenance, or adjustment.

Another object of my invention is to provide a unit of the type described which will operate successfully on a wide range of alternating current voltages.

Other objects of my invention will appear as the description proceeds.

I will describe several forms of units embodying my invention, and will then point out the novel features thereof in claims.

Figure 6:
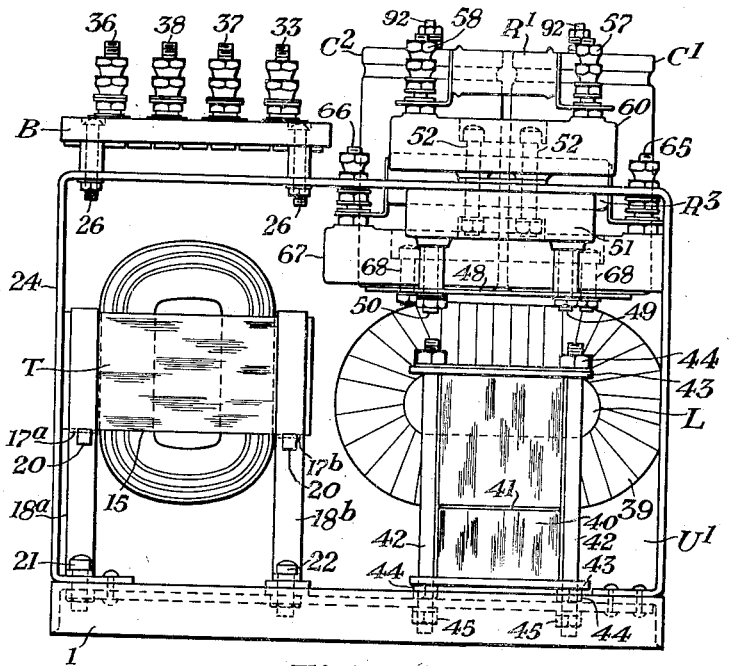
Figure 3:
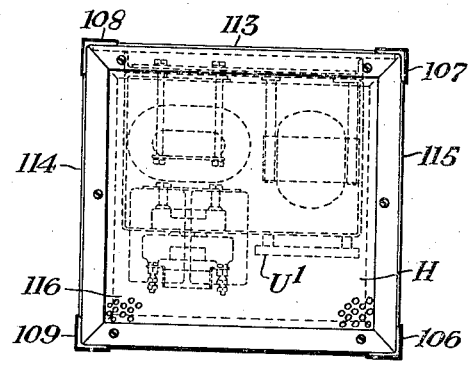
Figure 9:
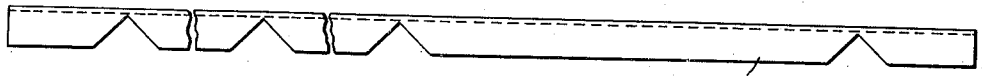
Figure 4:
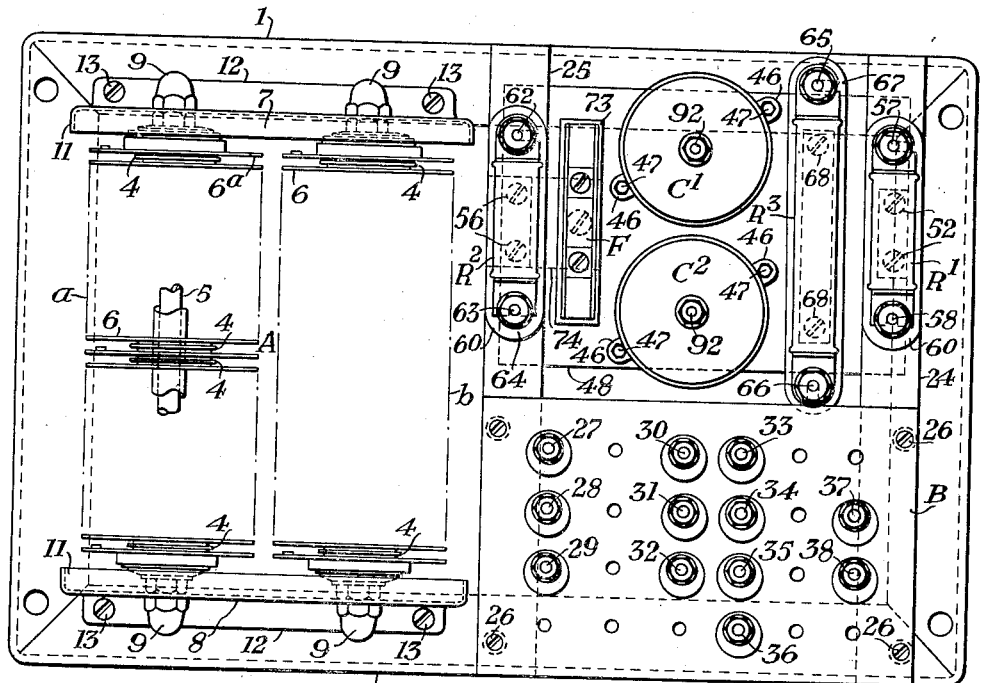
Figure 5:
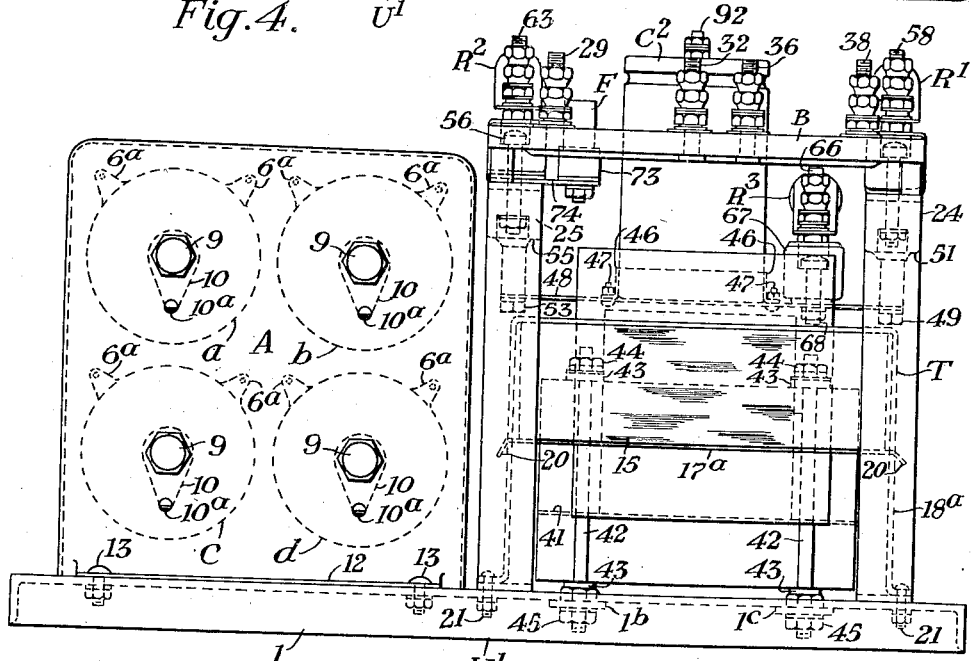
Figure 16:
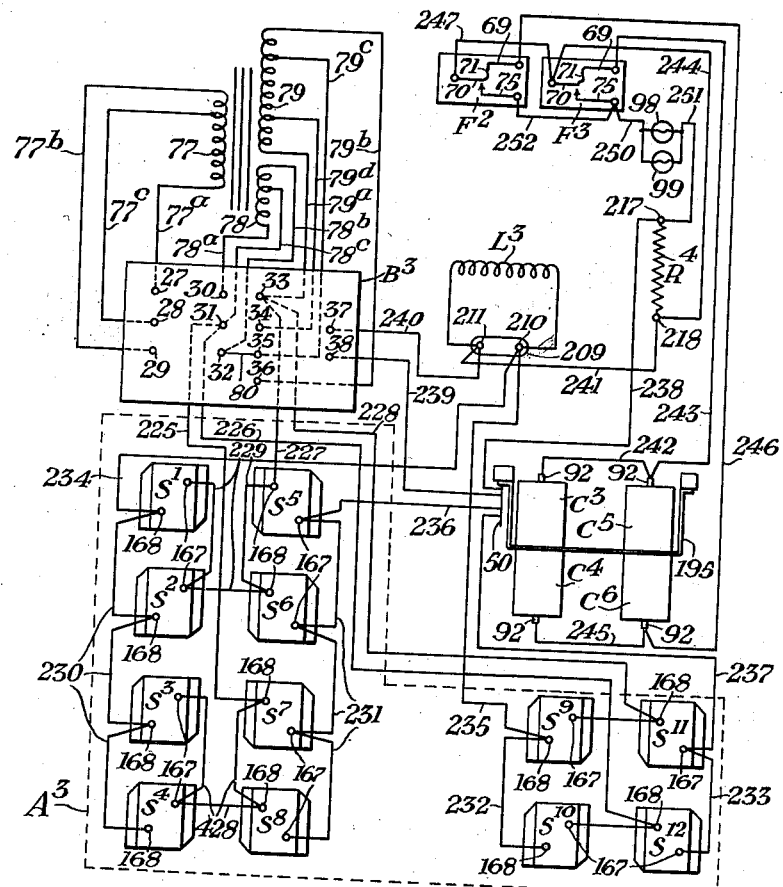
Figure 7:
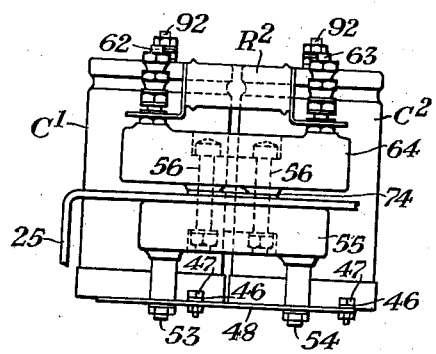
Figure 8:
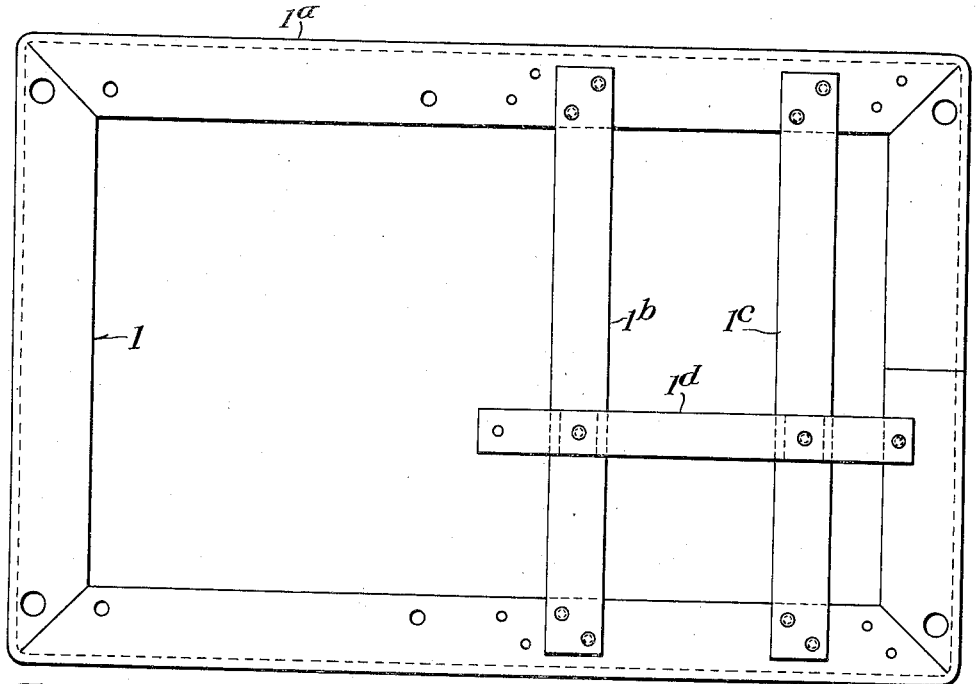
Figure 10:
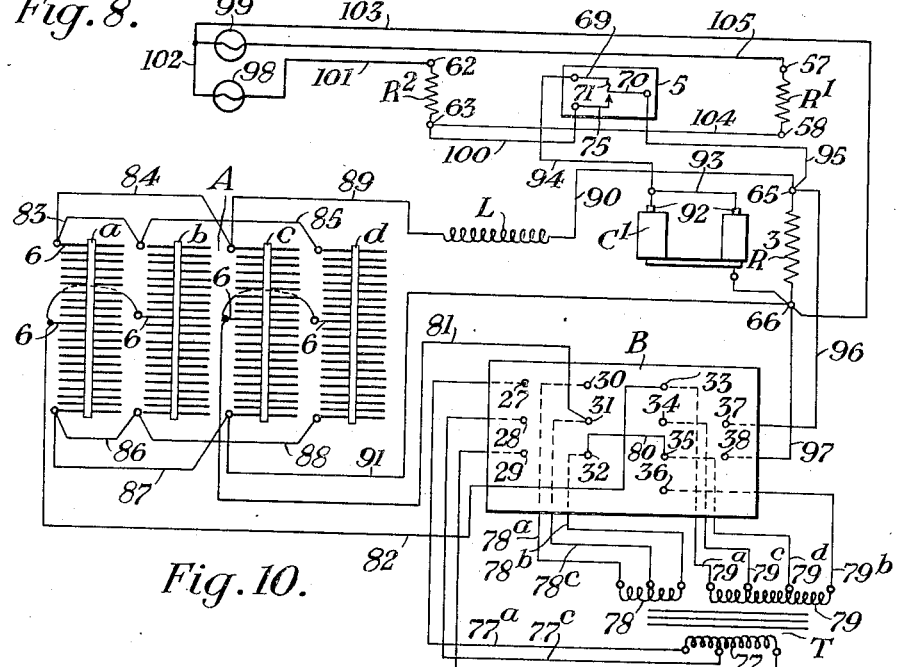
Figure 18:
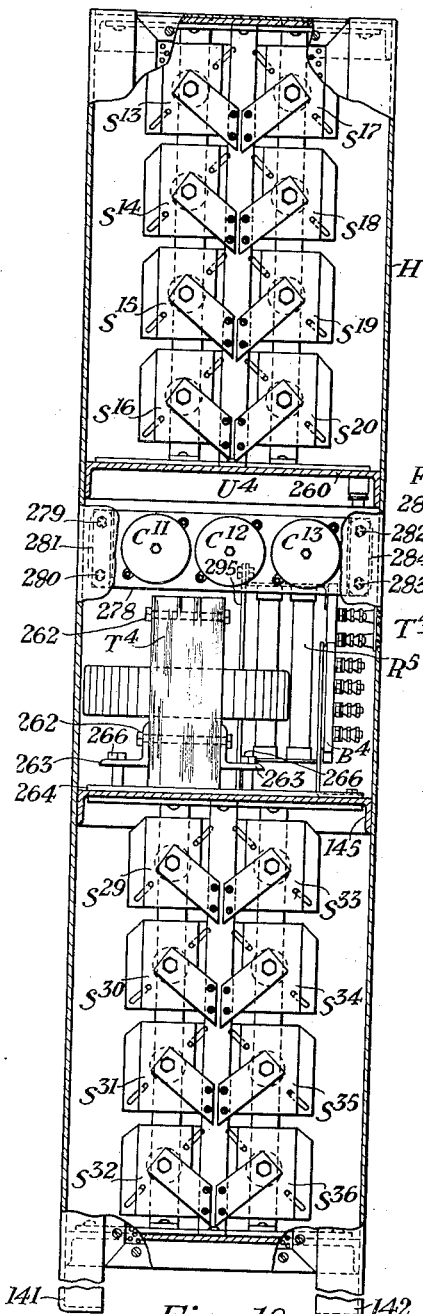
Figure 17:
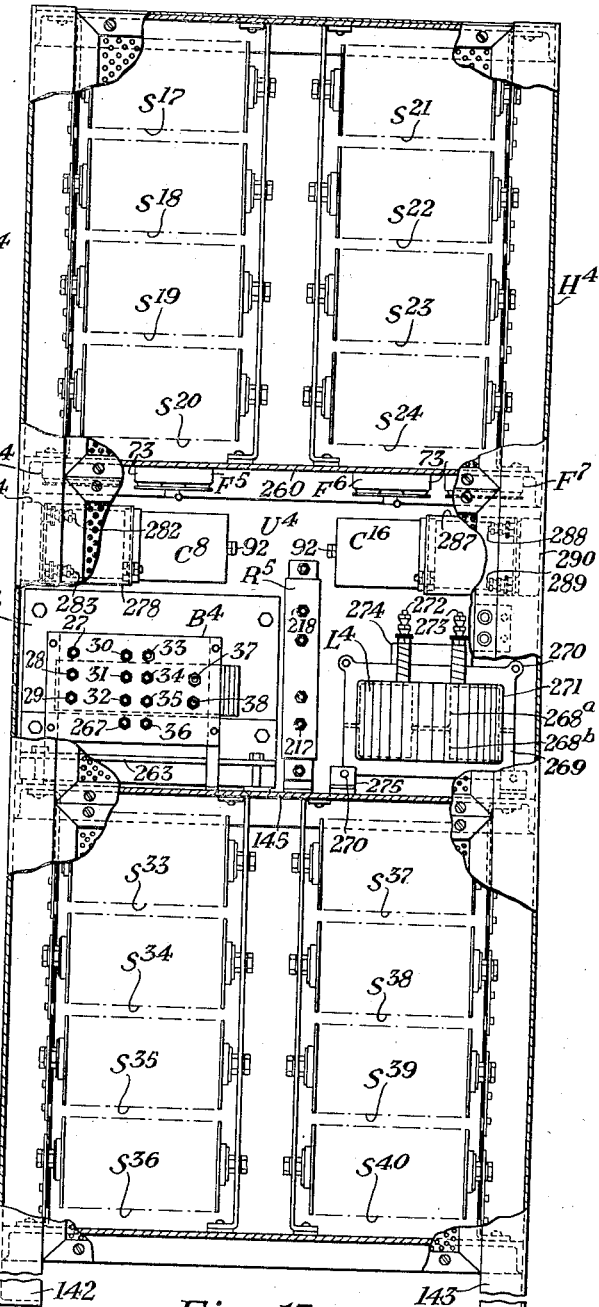
Figure 22:
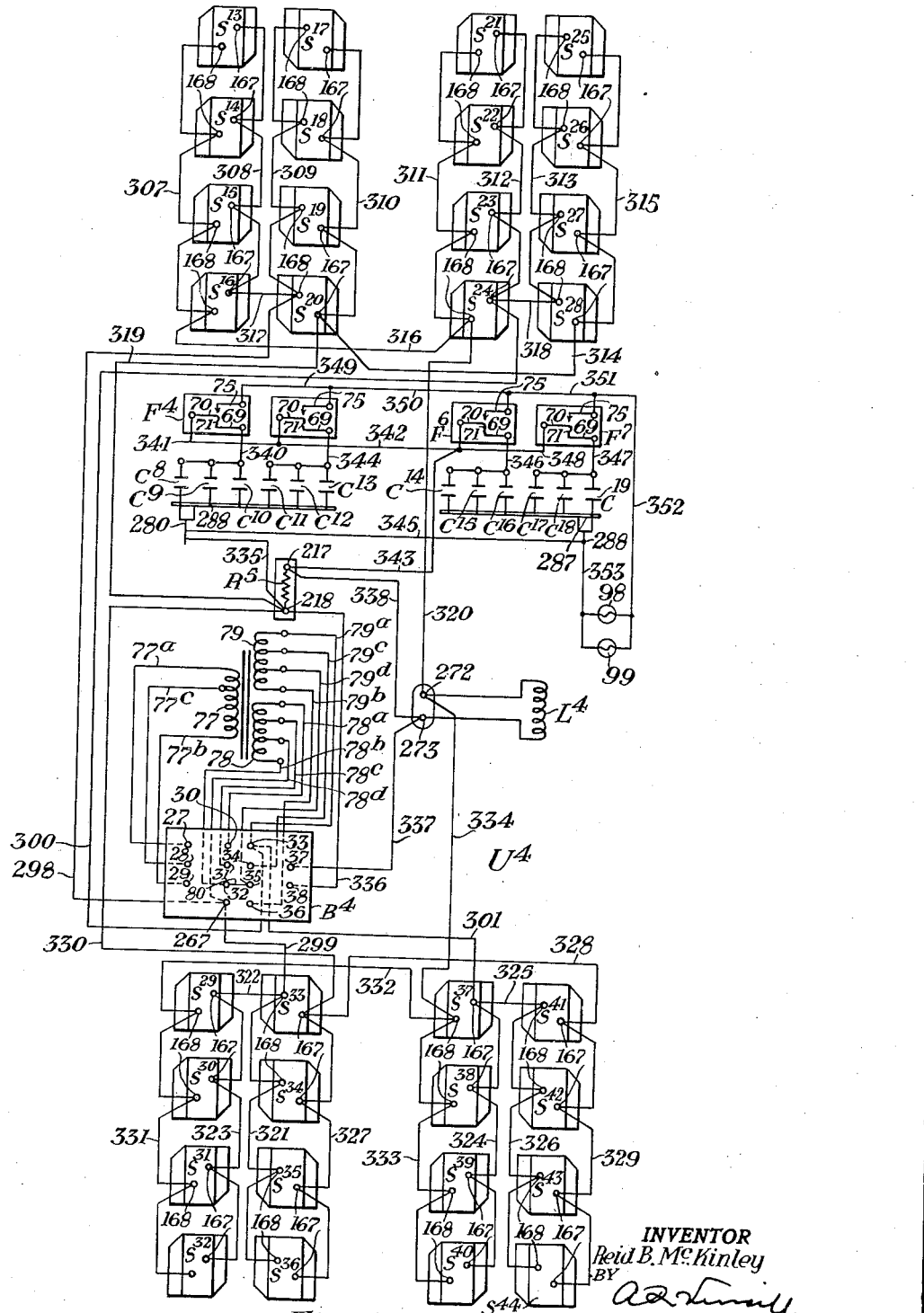

In the accompanying drawings, Fig. 1 is a front elevational view of a housing H containing two power supply units embodying my invention. Fig. 2 is a left-hand side view of the housing H shown in Fig. 1. Fig. 3 is a top plan view of the housing H shown in Fig. 1. Fig. 4 is an elevational view of the unit $U^1$ which is mounted in the housing H, this unit being rotated in a clockwise direction through an angle of 90° from the position which it occupies in the housing. Fig. 5 is a view of the unit $U^1$ as it appears when viewed from the lower side in Fig. 4. Fig. 6 is a view of the unit $U^1$ as it appears when viewed from the right in Fig. 5. Fig. 7 is a detail view of a portion of the unit $U^1$ as it appears when viewed from the left in Fig. 4. Fig. 8 is a front elevational view of the base I of the unit $U^1$ shown in Figs. 4, 5 and 6. Fig. 9 is a detail view showing a part of the base I as it appears during one step in the process of construction of the base. Fig. 10 is a wiring diagram for the unit $U^1$ shown in Figs. 4, 5 and 6. Fig. 11 is a front elevational view showing another form of power supply unit embodying my invention, certain of the parts being broken away to better illustrate the construction thereof. Figs. 12 and 13 are left-hand side and right-hand side views, respectively, of the power supply unit shown in Fig. 10, certain of the parts in these views also being broken away to better illustrate the construction of the unit. Fig. 14 is a sectional view taken on the line XIV—XIV of Fig. 13. Fig. 15 is a detail view showing one of the rectifier stacks forming part of the power supply unit illustrated in Figs. 11 to 14, inclusive. Fig. 16 is a diagrammatic view illustrating the wiring diagram for the unit shown in Figs. 11 to 14, inclusive. Fig. 17 is a front elevational view showing another form of power supply unit embodying my invention, certain of the parts being broken away to better illustrate the construction thereof. Figs. 18 and 19 are left-hand side and right-hand side views, respectively, of the power supply unit shown in Fig. 17, each of these views also having certain parts broken away for the sake of clearness. Figs. 20 and 21 are sectional views taken on the lines XX—XX and XI—XI, respectively, of Fig. 19. Fig. 22 is a wiring diagram of the unit shown in Figs. 17 to 21, inclusive.

Similar reference characters refer to similar parts in each of the several views.

Referring first to Figs. 1, 2 and 3, as here shown two power supply units $U^1$ and $U^2$ embodying my invention are mounted in a single housing H which also embodies my invention. The units $U^1$ and $U^2$ are similar, and it is believed, therefore, that a description of one will suffice for both.

Referring particularly to the unit $U^1$ shown in Figs. 4 to 6, inclusive, this unit in the form here illustrated comprises a suitable base I upon which all of the other parts of the unit are mounted. The base I may be of any preferred construction, but as best seen in Fig. 8, this base in the form here shown comprises an outer rim $I^a$ formed by cutting four spaced V-shaped notches in one leg of a straight piece of angle iron in the manner illustrated in Fig. 9, bending the other leg of the angle iron at the apex of the notches to form a rectangle, and then welding together the meeting edges of the one leg and the abutting ends of both legs so that the rim is, in effect, an integral rigid whole. The base also comprises two transverse straps $I^b$ and $I^c$ riveted or otherwise fastened at their ends to the opposite sides of the rim $I^a$ in parallel spaced relation adjacent one end of the rim, and a longitudinal strap $I^d$ riveted intermediate its ends to the two straps $I^b$ and $I^c$ adjacent one side of the base.

One advantage of constructing the base in the manner just described is that the base is relatively light in weight and at the same time is extremely rigid. Furthermore, the cost of construction of the base is small.

Disposed at the left-hand end of the base 1 as viewed in Figs. 4 and 5 is a full-wave rectifier A comprising, in the well-known form here illustrated, four stacks or legs a, b, c and d, each consisting of a plurality of rectifier disks 4 of the copper oxide variety assembled on, but insulated from, a supporting bolt 5. Interposed in each stack between adjacent disks are suitable conducting members, as well as a plurality of fins 6, the two end fins and the middle fin of each stack being provided with a radially extending apertured lug 6a. The fins 6 serve as a means for radiating the heat generated by the passage of current through the disks, and also as convenient terminals for making electrical connection with the disks. The stacks a, b, c and d are mounted in quadrature spaced relation in upright supports or end plates 7 and 8 provided with aligned holes through which the opposite ends of the bolts 5 extend, and are secured to the end plates by means of nuts 9 screwed onto the outer ends of the bolts. A metal member 10 is mounted on one end of each bolt 5 between the associated stack and the adjacent end plate 8, and each of these members is provided with an outwardly extending lug 10a which projects through a hole in the end plate 8, as best shown in Fig. 5, whereby the stacks are prevented from turning relative to each other and to the end plates. Each end plate is provided at its sides and upper end with inwardly extending stiffening flanges 11 and at its lower end with an outwardly extending flange 12. The rectifier is fastened to the base 1 by means of bolts 13 which extend through aligned holes formed in the flanges 12 and the horizontal portion of the rim 1a of the base 1 at opposite sides of the base, as clearly shown in Figs. 4 and 5.

Disposed at the right-hand side of the base 1, as viewed in Figs. 4 and 5 is a transformer T, a terminal board B, a reactor L, a plurality of condensers C$^1$ and C$^2$, three resistors R$^1$, R$^2$ and R$^3$, and a fuse F.

The transformer T may be of any suitable type, but, as here shown, this transformer comprises a shell type core 15, the middle leg of which is surounded by a primary and two secondary windings. The primary and secondary windings are not visible in Figs. 4, 5 and 6, but are shown diagrammatically in the wiring diagram for the unit illustrated in Fig. 10 wherein they are designated by the reference characters 77, 78 and 79, respectively. The core 15 rests on two horizontal straps 17a and 17b, one of which 17a is fastened at its ends to the legs of an inverted U-shaped bracket 18a which partly surrounds the core 15 on one side of the windings, and the other of which 17b is fastened at its ends to the legs of an inverted U-shaped bracket 18b which partly surrounds the core 15 on the other side of the windings. The straps 17a and 17b may be fastened to the associated brackets in any desired manner but, as here shown, the ends of the straps are provided with tongues 20 which extend through slots in the associated legs of the straps and are then bent downwardly. The lower ends of the bracket 18a are bolted to the rim 1a of the base 1 by means of bolts 21, and the lower ends of the bracket 18b are bolted to the strap 1d by means of bolts 22, and it follows, therefore, that the transformer T is securely fastened to the base by means of the straps 17a and 17b and the brackets 18a and 18b.

The terminal board B is of insulating material, and is secured to two inverted U-shaped brackets 24 and 25, directly above the transformer T, by means of bolts 26 which pass through the terminal board and through the brackets, suitable spacing sleeves being provided on the bolts between the terminal board and the brackets to raise the terminal board to the desired height. The brackets 25 and 24 are secured to the rim 1a of the base 1 by means of rivets which pass through the rim and through inwardly extending feet formed on the lower ends of the brackets. Mounted on the terminal board are a plurality of terminal posts designated by the reference characters 27 to 38, inclusive, which terminal posts are connected by means of suitable wires with certain of the devices making up the unit U$^1$, as will be more fully described hereinafter, and which serve to facilitate making external electrical connections with the unit, as will also be more fully described hereinafter.

The reactor L in the form here shown comprises a winding 39 surrounding one leg of a rectangular laminated core 40 provided with one or more air gaps 41. Four vertically disposed bolts 42 are fastened to the core 40 adjacent the four corners of the core by means of straps 43 and nuts 44, and the lower ends of these bolts extend through holes provided in the straps 1b and 1c of the base 1 and carry nuts 45, whereby the reactor is securely fastened to the base by means of the bolts.

The condensers C$^1$ and C$^2$ are fastened by means of lugs 46 and bolts 47 to a metal plate 48 which serves not only as a supporting plate for the condensers, but as a common connection for one terminal of the condensers, this connection being made through the lugs 46, bolts 47 and the cases of the condensers, these cases as here shown being metal. The supporting plate 48 is disposed directly above the reactor L and is fastened at one end to depending terminal posts 49 and 50 (see Fig. 6) mounted in a terminal block 51 which is secured by means of bolts 52 to the underside of the bracket 24, while the other end of the supporting plate is secured to depending terminal posts 53 and 54 (see Fig. 7) mounted in a terminal block 55 which is secured by means of bolts 56 to the underside of the bracket 25. The terminal posts 49, 50, 53 and 54, in addition to serving as a support for the plate 48, also serve as junction points for numerous wires, as will be described more fully hereinafter. The condensers C$^1$ and C$^2$ are of the electrolytic type, and each has one plate connected to its case and the other plate to a terminal post 92 mounted in the upper end of the condenser.

The resistor R$^1$ is secured by means of terminal posts 57 and 58 to a terminal block 60 which is bolted to the upper side of the bracket 24 by means of the same bolts 52 which bolt the terminal block 51 to the bracket 24, and the resistor R$^2$ is secured to terminal posts 62 and 63 mounted in a terminal block 64 which is bolted to the upper side of the bracket 25 by means of the same bolts 56 which bolt the terminal block 55 to the bracket 25.

The resistor R$^3$ is secured by means of terminal posts 65 and 66 to a terminal block 67 which is bolted to the plate 48 by means of bolts 68.

The fuse F is of a well-known type commonly used in telephone switchboards, and as shown diagrammatically in Fig. 10 this fuse comprises a first conducting member 69 biased by its own resiliency to an upper position, and a second conducting member 70 biased by its own resiliency to a lower position, the two conducting members being connected at their free ends by a fusible member 71 which normally holds the first member in a lower position in opposition to its bias, and the second member in an upper position in opposition to its bias. In operation, the fuse is connected in the circuit which it is desired to protect by the fuse in such manner that the current flowing in this circuit will flow through the two conducting members and the fusible member, and if this current exceeds the rating of the fuse, the fusible member 71 will melt and will permit the conducting member 69 to move upwardly due to its bias, and the conducting member 70 to move downwardly due to its bias. The conducting member 69 usually carries a colored glass bead which is conspicuous when the member occupies its upper position but not when this member occupies its lower position. The fuse F is mounted on a fuse block 73 which, as shown in Figs. 4 and 5, is secured to one end of a bracket 74, the other end of which is fastened to the bracket 25 by means of the bolts 56. The fuse block 73 is provided with a contact member 75 shown diagrammatically in Fig. 10, which member cooperates with the conducting member 70 in such manner that, when the conducting member moves to its lower position, it will engage the contact member 75 to close a contact 70—75.

It should be pointed out that, with the fuse and fuse block mounted in the position shown, the fuse, which is of relatively delicate construction, is protected from damage due to accidental bumping, and is at the same time clearly visible for inspection and readily accessible for replacement.

Referring now to Fig. 10, it will be seen that the primary 77 of transformer T is provided with terminal leads 77$^a$ and 77$^b$ and with a tap lead 77$^c$, which leads are connected respectively with the terminal posts 27, 29 and 28 of terminal board B on the under side of the terminal board. In a similar manner, the secondary 78 of transformer T is provided with terminal leads 78$^a$ and 78$^b$ and with a tap lead 78$^c$, which leads are connected respectively with the terminal posts 30, 32 and 31 of terminal board B on the under side of the terminal board, while the secondary 79 of transformer T is provided with terminal leads 79$^a$ and 79$^b$ and with tap leads 79$^c$ and 79$^d$, which leads are connected respectively with the terminal posts 33, 36, 34 and 35 of terminal board B on the under side of the terminal board. It will be apparent, therefore, that if a source of alternating current is connected with two of the terminal posts 27, 28 and 29, an alternating electromotive force will be available between each two of the terminal posts 30, 31 and 32 and also between each two of the terminal posts 33, 34, 35 and 36. It will also be apparent that by properly connecting different ones of the terminal posts 30, 31 and 32 with different ones of the terminal posts 33, 34, 35 and 36, all or part of either secondary winding of transformer T may be connected in series with all or part of the other secondary winding of transformer T in either an aiding or an opposing relation. The two secondary windings are so constructed that the electromotive forces which are available between the different terminal posts 30, 31 and 32 and between the different terminal posts 33, 34, 35 and 36 will all be different, and it follows that by properly connecting the two secondaries of transformer T together at these terminal posts, a large number of electromotive forces differing from each other by small increments may be obtained.

As shown in the drawings, the terminal posts 32 and 35 are connected together by a jumper 80, and the terminal post 31 is connected with one end of a wire 81, while the terminal post 33 is connected with one end of a wire 82. It will be seen, therefore, that, as here shown, the portion of secondary 78 of transformer T between tap lead 78$^c$ and terminal lead 78$^b$ is connected in series with the portion of secondary winding 79 between tap lead 79$^d$ and terminal lead 79$^a$ in such manner that the resultant electromotive force which is impressed on the wires 81 and 82 when current is supplied to the transformer T will be equal to the difference between the electromotive force which is induced in the indicated portions of the two secondary windings.

The free end of wire 82 is connected to the center fins 6 of the stacks $a$ and $b$ of rectifier A, and the free end of wire 81 is similarly connected with the center fin 6 of the stacks $c$ and $d$ of rectifier A. The upper fin 6 of stack $a$ is connected by means of wires 83 and 84 with the upper fin 6 of the stacks $b$ and $c$, respectively, and the upper fin 6 of stack $b$ is connected by means of wire 85 to the upper fin of stack $d$. It will be seen, therefore, that the upper fins of the stacks $a$, $b$, $c$ and $d$ are all connected together. The lower fin 6 of stack $a$ is connected by means of wires 86 and 87 with the lower fins 6 of stacks $b$ and $c$, respectively, and the lower fin of stack $b$ is connected by means of a wire 88 with the lower fin of stack $d$. It follows, therefore, that the lower fins of stacks $a$, $b$, $c$ and $d$ are also all connected together. The stacks $a$, $b$, $c$ and $d$ are each assembled in such manner that current will flow upwardly through these stacks, and with the stacks connected together in the manner just described, if a load is connected to the upper and lower fins of the stacks when alternating current is being supplied to the wires 81 and 82, direct current will flow from the upper fins through the load to the lower fins in a manner which is well understood in the art.

The upper fin 6 of stack $c$ is connected to one lead 89 of reactor L, and the other lead 90 of this reactor is connected to the previously described terminal post 65. The lower fin 6 of stack $c$ is connected by means of a wire 91 to the previously described terminal post 66. As was previously pointed out, the resistor R$^3$ is constantly connected between the terminal posts 65 and 66, and it follows, therefore, that this resistor will maintain a constant load on the rectifier. This resistor has a relatively high resistance as compared with the resistance of the load and is provided for the purpose of improving the regulation of the unit when the external load on the unit is small.

The terminal 92 of the condenser C$^1$ is connected to the terminal 92 of condenser C$^2$ by means of a wire 93 and to the terminal post 65 by means of a wire 94, the conducting member 69 of fuse F, fusible member 71 of fuse F, conducting member 70 of fuse F, and a wire 95. The terminal posts 65 and 66 are connected by means of wires 96 and 97, respectively, to the terminal posts 37 and 38 of the terminal board B, which latter terminal posts are adapted to be connected to the load which is to be supplied with current by the unit U$^1$. It will be apparent, therefore, that the reactor L and condensers C$^1$ and C$^2$ serve to smooth out the ripple in the current supplied by the rectifier to the external load in the usual and well-known manner.

It is desirable to be able to readily detect the failure of one of the condensers $C^1$ and $C^2$, and to accomplish this result the contact 70—75 of fuse F is utilized to control two indication lamps 98 and 99 which are secured to the housing H in which the unit $U^1$ is mounted in a manner which I will describe hereinafter. The lamp 98 is provided with a circuit which may be traced from terminal post 65 through wire 95, conducting member 70 of fuse F, contact member 75, wire 100, terminal post 63, resistor $R^2$, terminal post 62, wire 101, lamp 98, and wires 102 and 103 to terminal post 66. The lamp 99 is similarly provided with a circuit which may be traced from terminal post 65 through wire 95, conducting member 70 of fuse F, contact member 75, wire 100, terminal post 63, wire 104, terminal post 58, resistor $R^1$, terminal post 57, wire 105, lamp 99, and wire 103 back to terminal post 66.

With the fuse F and lamps 98 and 99 arranged in the manner described, it will be seen that as long as condensers $C^1$ and $C^2$ are functioning properly, the parts of fuse F will occupy the positions in which they are shown in the drawings, and under these conditions, the circuits for both lamps 98 and 99 will be open at contact 70—75 of fuse F, so that both of these lamps will then be extinguished. However, if one of the condensers $C^1$ or $C^2$ becomes short circuited, the fuse F will then be connected with the terminal posts 65 and 66, and hence with the output terminals 37 and 38 of the unit $U^1$, and the resultant current which will then flow through the fusible member 71 will melt this member and cause it to release the conducting members 69 and 70, thereby causing contact 70—75 to close. When this contact becomes closed, the circuits for both lamps will then be completed and both lamps will become lighted. The lighting of these lamps will give an indication that one of the condensers is defective, and the lamps will continue to burn until the defective condenser is replaced and a new fuse is inserted in place of the blown fuse.

It should be pointed out that the voltage available for lighting the lamps 98 and 99 is higher than the voltage in which lamps of the type which it is desired to employ are commercially available, and it is for the purpose of reducing the available voltage to the rated voltage of the lamps that the resistors $R^1$ and $R^2$ are provided.

Referring now again to Figs 1, 2 and 3, the housing 1 in which the units $U^1$ and $U^2$ are mounted comprises a framework consisting of four upright angle bars 106, 107, 108 and 109 riveted to the corners of the three horizontally disposed vertically spaced rectangular members 110, 111 and 112, each constructed in the same manner that the rim $1^a$ of the previously described base 1 of the unit $U^1$ is constructed. Attached to the back and two sides, respectively, of the frame are panel members 113, 114 and 115, each comprising a perforated sheet of metal having U-shaped strips welded thereto at its edges to prevent the edges, which are necessarily rough, from scratching persons handling the panel member, and also to improve the appearance of the panel member and at the same time strengthen it. A panel member 116 constructed in the same manner as the panels 113, 114 and 115 is also attached to the top of the frame, and two other panel members 117 and 118 which are also similar in construction to the panel members 113, 114 and 115 are attached to the front of the frame. For reasons which will be made clear presently, it is desirable to be able to easily remove any one of the panel members, and the panel members are accordingly fastened to the frame by means of tap bolts which are screwed into tapped holes provided in the sides of the rectangular members 110, 111 and 112.

The unit $U^1$ is fastened to the housing 1 in the upper part of the housing by means of two spaced horizontal straps 119 and 120 which are riveted at their opposite ends to the upright angle bars 107 and 108, and four bolts 121, two of which pass through aligned holes formed in the upper end of the rim $1^a$ of the base 1 and in the strap 119, and the remaining two of which pass through aligned holes formed in the lower end of the rim $1^a$ of the base 1 and in the strap 120. It will be seen, therefore, that the unit $U^1$ may be readily removed from the housing H by merely removing the bolts 121. The position of the unit $U^1$ within the housing is such that, when the panel member 117 is removed, ready access to the unit $U^1$ may be had for inspection, maintenance, test, and the like.

The unit $U^2$ is secured to the housing H in the lower part of the housing by means of two spaced horizontally disposed straps 122 and 123 and bolts 124 in the same manner that the unit $U^1$ is fastened to the housing, and ready access to this latter unit may be had at all times by removing the panel member 118.

The previously mentioned indication lamps 98 and 99 for indicating the failure of the condensers $C^1$ and $C^2$ are mounted in suitable insulating sockets 125 and 126 which are fastened to a plate 127 riveted to the angle bar 106. The sockets 125 and 126 are provided at their forward ends with bull's-eyes 128 and are disposed in such positions that, when the panel member 117 is in place, these bull's-eyes will project through clearance holes provided in the U-shaped binding strip of the panel member.

Two other indication lamps not shown are associated with the unit $U^2$, and these lamps are mounted in sockets 130 and 131 secured to a plate 132 which is also riveted to the angle bar 106 of the housing H. The sockets 130 and 131 are provided with bull's-eyes 128 which project through clearance holes formed in the U-shaped binding strip of the panel 118.

The incoming power wires and outgoing lead wires may be brought into, and led out of, the housing H through holes drilled in a plate 134 which is secured to the upper side of the horizontal member 112.

Referring now to Figs. 11 to 14, inclusive, I have here shown another power supply unit embodying my invention, which latter unit I have designated as a whole by the reference character $U^3$. This unit is mounted in a housing $H^3$ comprising a framework consisting of four upright angle bars 140, 141, 142 and 143 riveted or otherwise secured to the corners of three vertically spaced horizontally disposed rectangular members 144, 145 and 146, each constructed in a manner similar to the previously described rim $1^a$ of the base 1 of the unit $U^1$. Attached to the top, back, and two sides of the framework of the housing $H^3$ by means of tap bolts 148 which are screwed into screw-threaded holes formed in the rectangular members 144, 145 and 146 are panel members 149, 150, 151 and 152, respectively, each consisting of a sheet of perforated metal of the proper size, having its edges bound by U-shaped strips welded or otherwise fastened thereto, the U-shaped binding strips being provided at suitable locations with clearance holes for the reception of the tap bolts. Two other panel members 153 and 154, similar in construction to the panel members 149, 150, 151 and 152 are secured to the rectangular members at the front of the framework by means of tap bolts 148 in the same manner that the panel members 149, 150, 151 and 152 are secured to the rectangular members. It will be seen, therefore, that any one of the panel members may be quickly and easily removed by unscrewing the associated tap bolts 148, thus facilitating ready access to any part of the interior of the housing $H^3$.

Located in the lower part of the housing $H^3$ is a rectifier unit, designated as a whole by the reference character $A^3$. This unit in the form here shown comprises twelve rectifier stacks $s^1$, $s^2$, $s^3$ ... $s^{12}$. These stacks are all similar, and a description of one will therefore suffice for all. Referring particularly to the stack $s^1$ shown in Fig. 15, this stack in the form here shown comprises a plurality of rectifier disks 4 assembled on a bolt 5 which passes through suitable openings in the disks, and which is separated from the disks by an insulating sleeve 155. Disposed on each side of each disk 4 is a thin layer 156 of an impressionable conducting material, and interposed at suitable intervals in the stack are spacer members 157 and fins 158. The fins 158 serve to radiate the heat generated by the passage of current through the disks, and certain ones of these fins also serve as a means for making electrical connections with the disks. Those fins which serve only to radiate heat are in the form of squares having all four corners cut away, while the remaining fins are in the form of squares having only three corners cut away. The stack $s^1$ is divided into eight groups of five disks each, these groups being designated by the reference characters 159 to 166, inclusive. The disks are so arranged that the disks of each group are all stacked in the same direction, but that, the disks of adjacent groups are stacked in opposite directions. The fins are so arranged in the stack that a fin which serves as a connector is located at each end of each group of disks, and that those fins which are located between adjacent groups serve as a connector for the disks of both groups. The two fins at the opposite ends of each group are connected respectively, at the corners which are not cut away with bus bars 167 and 168, disposed at diagonally opposite corners of the fins, these bus bars being bent inwardly at one end to form offset portions 167ª and 168ª, respectively, for a purpose presently to be described. Pressure is applied to the stack by means of nuts 169 and 170 screwed onto the ends of the bolt 5, and interposed between the nut 169 and the adjacent fin 158 is a spring washer 171 and an insulating washer 172, while interposed between the nut 170 and the adjacent fin is a metal member 10, a spring washer 173 and an insulating washer 174. The insulating washers 172 and 174 serve to insulate the ends of the stack from the bolt 5, while the spring washers 171 and 173 tend to maintain a uniform pressure on the stacks. The function of the metal member 10 will be made clear hereinafter. The upper bus bar 167 serves as the negative bus bar of the stack and the lower bus bar 168 as the positive bus bar, and it will be apparent that between the two bus bars there are eight current paths, one formed by each of the eight groups of disks. The direction of current through the path formed by each group is indicated in the drawings by an arrow.

The stacks $s^1$ to $s^{12}$, comprising the rectifier unit $A^3$, are mounted in the housing $H^3$ in the following manner. Two spaced horizontal straps 175 and 176 are secured to the rectangular member 145 on opposite sides of the center of this member, and two other spaced straps 177 and 178 are secured to the rectangular member 146 in vertical alignment with the straps 175 and 176, respectively. Attached at their opposite ends to the aligned straps 175 and 177 in lateral spaced relation are two vertical brackets 179 and 180 (see Fig. 14), and attached at their opposite ends to the aligned straps 176 and 178 are two vertical brackets 181 and 182 similar to the brackets 179 and 180. The brackets 179 and 180 are located in the same vertical plane, and the brackets 181 and 182 are also located in the same vertical plane. A fifth vertical bracket 183 is secured at its opposite ends to the rectangular members 145 and 146 at the left-hand sides of these members, as viewed in Fig. 11, and a sixth vertical bracket 184, similar to the bracket 183, is secured at its opposite ends to the rectangular members 145 and 146 at the right-hand sides of these members, as viewed in Fig. 11. The bracket 183 is equally spaced from the two brackets 179 and 180, and is disposed in a plane which is parallel to the plane in which the brackets 179 and 180 are located, and the bracket 184 is likewise equally spaced from the brackets 181 and 182, and is located in a plane which is parallel to the plane in which the brackets 181 and 182 are located. The bracket 183 carries a plurality of upwardly inclined arms 185 (see Fig. 12), and the bracket 184 likewise carries a plurality of upwardly inclined arms 186 (see Fig. 13). The arms 185 and 186 are disposed in pairs with the arms extending in opposite directions from the associated vertical brackets, and each of these inclined arms is fastened to the associated vertical bracket by means of a pair of machine screws 187 which pass through clearance holes in the associated arm and are screwed into tap holes provided in the associated bracket. Each inclined arm is provided at its outer end with a hole which aligns horizontally with a similar hole provided in one of the straps 179, 180, 181 or 182, and each pair of aligned holes receives the opposite ends of the bolt 5 of a different one of the stacks $s^1$ to $s^{12}$ in a manner which will be readily understood from an inspection of the drawings. Each inclined arm 185 and 186 is also provided with a second hole which receives the outwardly extending lug 10ª of the metal member 10 provided on the associated stack, to prevent the stacks from turning. The stacks are secured to the associated vertical brackets and upwardly inclined arms by means of nuts 191 screwed onto the outer end of the bolts 5.

With the stack secured to the housing $H^3$ in the manner just described, it will be apparent that each stack $s$ may be removed from the housing without disturbing the remaining stacks by first removing the nut 191 from the associated bolt 5 at the end of the bolt which passes through the associated vertical bracket, and then removing the inclined arm 185 or 186 to which the other end of the stack is fastened, from the associated vertical bracket, by backing out the associated machine screws 187.

Mounted on each bolt 5 between the associated nut 170 and the associated inclined arm 185 or 186 is an insulating plate 192 (see Fig. 15). Each plate 192 is provided with a hole through which the lug 10$^a$ on the associated member 10 passes, whereby the insulating plate is held in a fixed relation with respect to the associated stack. Each plate 192 is also provided with two other holes which receive the offset portions 167$^a$ and 168$^a$ of the bus bars 167 and 168 of the associated stack, thus providing a convenient means for holding the bus bars in a fixed position to enable conductors to be soldered thereto.

Also located in the lower part of the housing H$^3$ are four condensers C$^3$, C$^4$, C$^5$ and C$^6$, two of which C$^3$ and C$^5$ are fastened by means of lugs 46 and bolts 47 to the upper side of a U-shaped bracket 195, and the remaining two of which, C$^4$ and C$^6$ are fastened by means of lugs 46 and bolts 47 to the under side of the web of the U-shaped bracket 195 directly below the condensers C$^3$ and C$^5$, respectively. The U-shaped bracket 195, in turn, is secured at one end to depending terminal post 49 and 50 mounted in a terminal block 51 which is bolted to the under side of the rectangular member 145 at the forward side thereof, as viewed in Fig. 11, and at the other end to depending terminal posts 53 and 54 mounted in a terminal block 55 which is bolted to the under side of the rectangular member 145 at the side opposite to the terminal block 51.

Disposed in the upper part of the housing H$^3$ is a transformer T$^3$, a terminal board B$^3$, a reactor L$^3$ and a resistor R$^4$.

The transformer T$^3$ is similar to the previously described transformer T, and is secured by means of four bolts 202 to horizontal supporting members which, in turn, are secured at their ends to the rectangular member 145 at the front and back of this member. The bolts 202 are secured to the transformer T$^3$ by means of nuts 203 and straps 204 in an obvious manner.

The terminal board B$^3$ is similar to the previously described terminal board B and is fastened by means of bolts 205 (see Fig. 11) to the vertical legs of two L-shaped brackets 206, the horizontal legs of which are fastened to the rectangular member 145 at its forward side, the parts being so arranged that ready access to the forward side of the terminal board may be had by removing the panel 153 of the housing H$^3$. Mounted on the terminal board B$^3$ are terminal posts 27 to 38, inclusive.

The reactor L$^3$ is similar to the previously described reactor L, and is fastened by means of bolts 42 to two horizontal supporting members 207, one of which, as viewed in Fig. 14, is bolted at one end to the rectangular member 145 by means of one of the bolts 52 which fasten the terminal block 51 to the rectangular member, and at the other end to the rectangular member 145 by means of one of the bolts 156 which fasten the terminal block 55 to the rectangular member. The other horizontal supporting member 207 is secured to the rectangular member 145 by means of bolts 208.

An insulating terminal block 209 provided with two terminal posts 210 and 211 is secured to the strap 176 and one of the straps 207 at the forward side of the housing. The terminal posts 210 and 211 are adapted to be connected with the leads of the reactor L, as will be more fully described hereinafter, and serve as a convenient means for making connections with the reactor, as will also be described more fully hereinafter.

The resistor R$^4$ is of well-known construction, and comprises an insulating tube 213, upon which resistance wire is wound, secured to two Z-shaped end plates 214 and 215 which also support a terminal board 216 carrying terminal posts 217 and 218 which are connected to the ends of the resistance wire. The end plates 214 and 215 are fastened to the rectangular member 145 at the right-hand side thereof, as viewed in Figs. 11 and 14, by means of bolts 219 and 220.

Two sockets 125 and 126 containing indication lamps 98 and 99 are fastened to a plate 127 which is riveted to the angle bar 143. The sockets 125 and 126 are provided with bulls'-eyes 128 which, when the panel 153 is in place, project through holes provided in the U-shaped binding strip of this panel. The function of these lamps will be made clear presently.

Two fuse blocks 73 are secured to the rectangular member 144 at the forward side thereof (see Fig. 11), and mounted in these fuse blocks are two fuses F$^2$ and F$^3$ similar to the previously described fuse F.

Referring now to the wiring diagram for the unit U$^3$ shown in Fig. 16, it will be seen that the leads 77$^a$, 77$^c$, 77$^b$, 78$^a$, 78$^c$, 78$^b$, 79$^a$, 79$^d$, 79$^c$ and 79$^b$ of transformer T$^3$ are connected respectively to the terminal posts 27 to 36, inclusive, of terminal board B$^3$ in the same manner that the corresponding leads of transformer T are connected to the terminal posts 27 to 36, inclusive, of terminal board B. Terminal posts 32 and 35 are connected together by the jumper 80, and terminal post 31 is connected to one end of each of two wires 225 and 226, while terminal post 33 is connected to one end of each of two wires 227 and 228. It will be seen, therefore, that, when primary 77 of transformer T is energized, an electromotive force will be impressed on wires 225 and 227 and also on wires 226 and 228, which electromotive force will be equal to the sum of the electromotive forces induced in the portion of secondary 78 between leads 78$^c$ and 78$^b$ and the portion of secondary 79 between leads 79$^a$ and 79$^c$.

The free end of the wire 225 is connected to the positive bus bar 168 of stack $s^7$, and the free end of wire 227 is connected with the positive bus bar 168 of stack $s^5$. The positive bus bar 168 of stack $s^7$ is also connected by means of a wire 428 with the positive bus bar 168 of stack $s^8$, and with the negative bus bars 167 of stacks $s^3$ and $s^4$, while the positive bus bar 168 of stack $s^5$ is also connected by means of a wire 229 with the positive bus bar 168 of stack $s^6$, and with the negative bus bars 167 of stacks $s^1$ and $s^2$. The positive bus bars of stacks $s^1$, $s^2$, $s^3$ and $s^4$ are all connected together by means of a wire 230, and the negative bus bars of stacks $s^5$, $s^6$, $s^7$ and $s^8$ are all connected together by a wire 231. The free end of wire 226 is connected to the positive bus bar 168 of stack $s^{12}$, and the free end of wire 228 is connected to the positive bus bar 168 of stack $s^{11}$. The positive bus bars 168 of stacks $s^9$ and $s^{10}$ are connected together by a wire 232, and the negative bus bars of stacks $s^{11}$ and $s^{12}$ are connected together by a wire 233. The positive bus bar 168 of stack $s^1$ is also connected to a wire 234, and the negative bus bar 167 of stack $s^5$ is connected to a wire 236, while the positive bus bar of stack $s^9$ is also connected with a wire 235 and the negative bus bar 167 of stack $s^{11}$ with a wire 237.

With the stacks connected together, and connected with the wires 225, 227, 226 and 228 in the manner just described, it will be readily understood that when the wires 225 and 227 are supplied with alternating current, the wires 234 and 236 will be supplied with rectified direct current by the stacks $s^1$ to $s^8$, inclusive, of rectifier unit $A^3$, and that, when the wires 226 and 228 are supplied with alternating current, the wires 235 and 237 will be supplied with rectified direct current by the stacks $s^9$ to $s^{11}$, inclusive, of the rectifier unit $A^3$.

The free ends of the wires 234 and 235 are connected to the terminal post 210, and the free ends of the wires 236 and 237 are connected to the terminal post 50. Terminal post 210 is also connected to one terminal of reactor $L^3$, while terminal post 50 is also connected to terminal post 217 by means of a wire 238, and to terminal post 38 by means of a wire 239. The remaining terminal of reactor L is connected to terminal post 211, which latter terminal post is further connected to terminal post 37 by means of a wire 240, and to terminal post 218 by means of a wire 241. It will be seen, therefore, that resistor $R^4$ is connected in series with the winding of reactor $L^3$ between wires 234 and 236 and also between wires 235 and 237, so that, when the wires 234, 236, 235 and 237 are supplied with rectified current, the resistor $R^4$ will maintain a constant load on the rectifier. It will also be seen that, if an exterior load is connected to the terminal posts 37 and 38, which terminal posts constitute the output terminals of the unit, the reactor $L^3$ will be connected in series with this load between the wires 234 and 236 and between the wires 235 and 237.

The terminals 92 of the condensers $C^3$ and $C^5$ are connected together by a wire 242, and the terminal 92 of condenser $C^5$ is also connected to the terminal post 218 by means of a wire 243, the conducting member 69 of fuse $F^3$, fusible member 71 of fuse $F^3$, conducting member 70 of fuse $F^3$, and wire 244. The terminals 92 of condensers $C^4$ and $C^6$ are likewise connected together by a wire 245, and the terminal 92 of condenser $C^6$ is further connected to the terminal post 218 by means of wire 246, conducting member 69 of fuse $F^2$, fusible member 71 of fuse $F^2$, conducting member 70 of fuse $F^2$, and wires 247 and 244 to terminal post 218. It will be seen, therefore, that condensers $C^3$ and $C^5$ are connected in parallel, and are included in a branch circuit which may be traced from terminal post 37 through wires 240, 241 and 244, conducting member 70 of fuse $F^3$, fusible member 71 of fuse $F^3$, conducting member 69 of fuse $F^3$, wire 243, condensers $C^3$ and $C^5$ in parallel, bracket 195, terminal post 50, and wire 239 to terminal post 38. It will also be seen that the condensers $C^4$ and $C^6$ are connected in parallel, and are connected in a circuit which may be traced from terminal post 37 through wires 240, 241, 244 and 247, conducting member 70 of fuse $F^2$, fusible member 71 of fuse $F^2$, conducting member 69 of fuse $F^2$, wire 246, condensers $C^4$ and $C^6$ in parallel, bracket 195, terminal post 50, and wire 239 to terminal post 38. It follows that the condensers $C^3$, $C^4$, $C^5$ and $C^6$ are all connected in parallel with any load which may be connected with terminal posts 37 and 38 and also with the resistor $R^4$. It also follows that, if either one of the condensers $C^3$ or $C^5$ should fail, the fuse $F^3$ will then be connected directly across the output terminals 37 and 38, and under these conditions the fusible member 71 will blow and cause the fuse to close its contacts 70—75. Likewise, if one of the condensers $C^4$ or $C^6$ should become short-circuited, the fuse $F^2$ will then be connected directly across the output terminals 37 and 38, and under these conditions the fusible member 71 of fuse $F^2$ will blow and cause the fuse $F^2$ to close its contact 70—75.

When contact 70—75 of fuse $F^2$ becomes closed, a circuit is completed for the lamps 98 and 99 passing from terminal post 218 through wires 244 and 247, contact 70—75 of fuse $F^2$, wires 252 and 250, the lamps 98 and 99 connected in multiple, and wire 251 to terminal post 217. In a similar manner, when contact 70—75 of fuse $F^3$ becomes closed, it completes another circuit for the lamps 98 and 99, which latter circuit may be traced from terminal post 218 through wire 244, contact 70—75 of fuse $F^3$, wire 250, the lamps 98 and 99 in parallel, and wire 251 to terminal post 217. When either one of the circuits just traced becomes closed, the lamps 98 and 99 will become lighted, thereby indicating that one or more of the condensers $C^3$, $C^4$, $C^5$ or $C^6$ has become short-circuited. After the lamps 98 and 99 have once become lighted, they will remain lighted until the defective condenser is replaced and a new fuse is provided to replace the fuse which became blown due to the defective condenser.

Referring now to Figs. 17 to 21, inclusive, I have here shown still another form of power supply unit embodying my invention, this latter unit being designated as a whole by the reference character $U^4$ and being mounted in a housing $H^4$. The housing $H^4$ is similar to the previously described housing $H^3$ with the following exceptions: The height of the housing $H^4$ has been increased to accommodate additional rectifier stacks, as will be made clear hereinafter, and in order to provide the housing with the necessary additional strength and to facilitate the mounting of the additional stacks in the housing, an additional rectangular member, designated by the reference character 260, has been provided. Furthermore, the lengths of the side and back panels have been increased an amount corresponding to the increased height of the housing, and the front of the housing, instead of being closed by two panels, as is the case of the housing $H^3$, is closed by means of three panels, the top and bottom ones of which are the same size and shape as the panel 154 of the housing $H^3$.

Disposed in the upper part of the housing $H^4$ is a group of sixteen rectifier stacks, each designated by the reference character s with a suitable distinguishing exponent, and disposed in the lower part of the housing $H^4$ is another group of sixteen rectifier stacks, each of which is also designated by the reference character s with a suitable distinguishing exponent. Each stack s is similar to the previously described stack $s^1$, and the stacks of each group are mounted in the housing $H^4$ in the same manner that the previously described stacks $s^1$ to $s^{12}$ are mounted in the housing $H^3$.

Disposed in the housing $H^4$ between the two groups of rectifier stacks are a transformer $T^4$, a terminal board $B^4$, a reactor $L^4$, twelve condensers $C^8$ to $C^{19}$, inclusive, a resistor $R^5$, and four fuses $F^4$, $F^5$, $F^6$ and $F^7$.

The transformer $T^4$ is of the same general type as the previously described transformer T, but has a somewhat larger capacity than the transformer T, and has its core laminations bolted together by means of bolts 262 which extend through aligned holes in the laminations, one bolt, as here shown, being located near each corner of the core. Secured to the opposite sides of the transformer core near the bottom of the core, by means of the two lower bolts 262, are two angle brackets 263. The core of the transformer rests at its opposite ends on two transformer supports 264 and 265 which are secured at their opposite ends to the rectangular member 145, and the angle brackets 263 are apertured to receive the shanks of stud bolts 266, the screw-threaded ends of which are screwed into tap holes provided in the transformer supports, whereby the transformer is rigidly fastened to the housing $H^4$.

The terminal board $B^4$ is similar to the previously described terminal board B, and is secured to the rectangular member 145 in the same manner that the terminal board $B^3$ is secured to the rectangular member 145. The terminal board $B^4$ has mounted thereon terminal posts 27 to 38, inclusive, and a terminal post 267.

The reactor $L^4$, as here shown, comprises two E-shaped laminated core sections $268^a$ and $268^b$ clamped together with their legs in spaced relation, by means of two clamping plates 269 and four bolts 270 which extend through aligned holes provided in the corners of the clamping plates, the proper spacing between the legs being maintained by fixed non-magnetic spacing members in a well-known manner. The reactor $L^4$ also comprises a winding 271 which surrounds the confronting middle legs of the two core sections. To facilitate the making of electrical connections with the winding 271, the terminal leads of the winding are secured to two terminal posts 272 and 273, mounted in a terminal block 274 which is bolted to the upper edge of the one clamping plate 269. Four feet 275 are bolted to the reactor at its lower corners by means of the two lower bolts 270, and these feet are secured by means of tap bolts 276 (see Fig. 21) to two straps 277, which straps, in turn, are secured to the rectangular member 145, thus securing the reactor to the housing $H^4$.

The condensers $C^8$, $C^9$ and $C^{10}$ are bolted to one side of the web of a U-shaped bracket 278 by means of lugs 46 and bolts 47, and the condensers $C^{11}$, $C^{12}$ and $C^{13}$ are bolted to the other side of the web of the bracket 278 in axial alignment with the condensers $C^{10}$, $C^9$ and $C^8$, respectively, by means of lugs 46 and the same bolts 47 which fasten the condensers $C^8$, $C^9$ and $C^{10}$ to the bracket 278. One end of the bracket 278 is fastened to two terminal posts 279 and 280 mounted in a terminal block 281 which is bolted to the angle bar 141, and the other end of the bracket 278 is fastened at two other terminal posts 282 and 283 mounted in a terminal block 284 which is bolted to the angle bar 142. In a similar manner, the condensers $C^{14}$, $C^{15}$ and $C^{16}$ are bolted to one side of the web of a U-shaped bracket 287 by means of lugs 46 and bolts 47, and the condensers $C^{17}$, $C^{18}$ and $C^{19}$ are bolted to the other side of the web of the bracket 287 in axial alignment with the condensers $C^{14}$, $C^{15}$ and $C^{16}$, respectively, by means of lugs 46 and the same bolts 47 which fasten the condensers $C^{14}$, $C^{15}$ and $C^{16}$ to the bracket 287. One end of the bracket 287 is fastened at two terminal posts 288 and 289 mounted in a terminal block 290 which is bolted to the angle bar 143, and the other end of the bracket 287 is fastened to two terminal posts 292 and 293 mounted in a terminal block 294 which is bolted to the angle bar 140. It will be noted that the bracket 278 is disposed directly above the transformer $T^4$, while the bracket 287 is disposed directly above the reactor $L^4$.

Resistor $R^5$ is secured to the rectangular member 145 of the housing $H^4$ at the forward side thereof, between the transformer T and reactor L, by means of an L-shaped bracket 295.

The fuses $F^5$, $F^4$, $F^6$ and $F^7$ are all similar to the previously described fuses F, and are each mounted on fuse blocks 73, which fuse blocks, in turn, are bolted to the under side of the rectangular member 260 of the housing $H^4$ at the forward side of the rectangular member.

Referring now to the wiring diagram for the unit $U^4$ shown in Fig. 22, it will be seen that the leads $77^a$, $77^c$, $77^b$, $78^a$, $78^c$, $78^b$, $79^a$, $79^c$, $79^d$ and $79^b$ of transformer $T^4$ are secured respectively to the terminal posts 27 to 36, inclusive, of terminal board B. It will also be seen that the secondary winding 78 of transformer $T^4$, as here shown, is provided with an additional tap lead $78^d$, which tap lead is secured to the terminal post 267 of terminal board B. The terminal posts 32 and 35 are connected together by a jumper 80, and the terminal post 267 is connected to two wires 298 and 299, while the terminal post 33 is connected to two wires 300 and 301. It will be seen, therefore, that when the primary 77 of transformer T is energized, an electromotive force will be impressed between the wires 298 and 300, and also between the wires 299 and 301, which electromotive force will be equal to the sum of the electromotive forces induced in the portion of the secondary 78 of transformer $T^4$ between the leads $78^b$ and $78^d$ and in the portion of the secondary 79 of transformer $T^4$ between the leads $79^d$ and $79^a$.

The wires 298 and 300 are respectively connected at their free ends with the bus bar 168 of stack $s^{20}$ and with the bus bar 167 of stack $s^{24}$, and the bus bar 168 of stack $s^{20}$, in turn, is connected with the bus bar 168 of stacks $s^{17}$, $s^{18}$ and $s^{19}$ by means of a wire 309, and with the bus bar 167 of stacks $s^{13}$, $s^{14}$, $s^{15}$ and $s^{16}$ by means of wires 317 and 308, while the bus bar 167 of stack $s^{24}$ is connected with the bus bar 167 of stacks $s^{21}$, $s^{22}$ and $s^{23}$ by means of a wire 312, and with the bus bar 168 of stacks $s^{25}$, $s^{26}$, $s^{27}$ and $s^{28}$ by means of wires 318 and 313. The bus bars 167 of stacks $s^{17}$, $s^{18}$, $s^{19}$, $s^{20}$, $s^{25}$, $s^{26}$, $s^{27}$ and $s^{28}$ are all connected together by wires 310, 314 and 315, and the bus bars 168 of stacks $s^{13}$, $s^{14}$, $s^{15}$, $s^{16}$, $s^{21}$, $s^{22}$, $s^{23}$ and $s^{24}$ are all connected together by wires 307, 316 and 311 in the manner shown. The bus bar 167 of stack $s^{20}$ is further connected to one end of a wire 319, and the bus bar 168 of stack $s^{24}$ is further connected to one end of a wire 320. The wires 319 and 320 constitute the output wires for the group of stacks $s^{13}$ to $s^{28}$, inclusive, and it will be apparent that when the wires 298 and 300 are supplied with alternating current in the manner previously described, the wires 319 and 320 will be supplied with rectified direct current.

The wires 299 and 301 are respectively connected at their free ends with the bus bar 168 of stack $s^{33}$, and with the bus bar 167 of stack $s^{37}$, and the bus bar 168 of stack $s^{33}$, in turn, is connected with the bus bars 168 of stacks $s^{34}$, $s^{35}$ and $s^{36}$ by means of a wire 321, and with the bus bars 167 of stacks $s^{29}$, $s^{30}$, $s^{31}$ and $s^{32}$ by means of wires 322 and 323, while the bus bar 167 of stack $s^{37}$ is connected with the bus bars 167 of stacks $s^{38}$, $s^{39}$ and $s^{40}$ by means of a wire 324, and with the bus bars 168 of stacks $s^{41}$, $s^{42}$, $s^{43}$ and $s^{44}$ by means of wires 325 and 326. The bus bars 167 of stacks $s^{33}$, $s^{34}$, $s^{35}$, $s^{36}$, $s^{41}$, $s^{42}$, $s^{43}$ and $s^{44}$ are all connected together by wires 327, 328 and 329, and are also connected with one end of a wire 330, and the bus bar 168 of stacks $s^{29}$, $s^{30}$, $s^{31}$, $s^{32}$, $s^{37}$, $s^{38}$, $s^{39}$ and $s^{40}$ are connected together by wires 331, 332 and 333, and are also connected to one end of a wire 334. The wires 330 and 334 constitute the output wires for the stacks $s^{29}$ to $s^{44}$, and it will be apparent that these wires will be supplied with rectified direct current by the stacks $s^{29}$ to $s^{44}$ when the wires 299 and 301 are supplied with alternating current.

The free ends of wires 319 and 330 are connected to terminal post 218, and the free ends of wires 320 and 334 are connected to terminal post 272. The terminal post 218 is also connected to one end of resistor $R^5$, and to terminal post 38 by means of a wire 336, and the terminal post 272 is also connected to one terminal of reactor $L^4$, as was pointed out hereinbefore. The other terminal of reactor L is connected to terminal post 273, which latter terminal post is also connected to terminal post 217 by means of a wire 338, and to terminal post 37 by means of a wire 337. Terminal post 217 is, of course, connected to the opposite terminal of resistor $R^5$ from terminal post 218. It will be seen, therefore, that, if a load is connected with the terminal posts 37 and 38, one-half the load current will be rectified by the one group of stacks and the other half of the load current will be rectified by the other group of stacks, and that the total load current will flow through the reactor $L^4$. It will also be seen that resistor $R^4$ constitutes a constant load on both groups of stacks.

The condensers $C^8$, $C^9$ and $C^{10}$ are connected in parallel and are included in a branch circuit which may be traced from terminal post 38 through wire 336, terminal post 218, wire 335, terminal post 280, bracket 288, condensers $C^8$, $C^9$ and $C^{10}$ connected in parallel, wire 340, conducting member 69 of fuse $F^4$, fusible member 71 of fuse $F^4$, conducting member 70 of fuse $F^4$, wires 341, 342 and 343, terminal post 217, and wires 338 and 337 to terminal post 37. The condensers $C^{11}$, $C^{12}$ and $C^{13}$ are likewise connected in parallel and are included in a branch circuit which may be traced from terminal post 38, through wire 336, terminal post 218, wire 335, terminal post 280, bracket 288, condensers $C^{11}$, $C^{12}$ and $C^{13}$ in parallel, wire 344, conducting member 69 of fuse $F^5$, fusible member 71 of fuse $F^5$, conducting member 70 of fuse $F^5$, wires 342 and 343, terminal post 217, wire 338, terminal post 273, and wire 337 to terminal post 37. The condensers $C^{14}$, $C^{15}$ and $C^{16}$ are also connected in parallel and are included in a circuit which may be traced from terminal post 38 through wire 336, terminal post 218, wire 335, terminal post 280, wire 345, terminal post 288, bracket 287, the condensers $C^{14}$, $C^{15}$ and $C^{16}$ in parallel, wire 346, conducting member 69 of fuse $F^6$, fusible member 71 of fuse $F^6$, conducting member 70 of fuse $F^6$, wire 343, terminal post 217, wire 338, terminal post 273, and wire 337 to terminal post 37. The condensers $C^{17}$, $C^{18}$ and $C^{19}$ are further connected in parallel, and are included in a branch circuit which may be traced from terminal post 38, wire 336, terminal post 218, wire 335, terminal post 280, wire 345, terminal post 288, bracket 287, condensers $C^{17}$, $C^{18}$ and $C^{19}$ in parallel, wire 347, conducting member 69 of fuse $F^7$, fusible member 71, conducting member 70 of fuse $F^7$, wires 348 and 343, terminal post 317, wire 338, terminal post 273, and wire 337 to terminal post 37. It will be seen, therefore, that the condensers $C^8$ to $C^{17}$ are connected in parallel with any load which is connected to the terminal posts 37 and 38 of terminal board $B^4$. It will also be seen that if one of the condensers $C^8$, $C^9$ or $C^{10}$ becomes short-circuited, fuse $F^4$ will blow, if one of the condensers $C^{11}$, $C^{12}$ or $C^{13}$ becomes short-circuited, fuse $F^5$ will blow, if one of the condensers $C^{14}$, $C^{15}$ or $C^{16}$ becomes short-circuited, fuse $F^6$ will blow, and if one of the condensers $C^{17}$, $C^{18}$ or $C^{19}$ becomes short-circuited, fuse $F^7$ will blow.

The indication lamps 98 and 99 are connected in four parallel circuits, each of which is controlled by one of the fuses $F^4$. The circuit for the lamps 98 and 99 controlled by fuse $F^4$ may be traced from terminal post 217 through wires 343, 342 and 341, contact 70—75 of fuse $F^4$, wires 349, 350, 351 and 352, lamps 98 and 99 in parallel, wires 353 and 345, terminal post 280, and wire 335 to terminal post 218. Each of the other circuits for the lamps 98 and 99 are similar to the circuit just described and will be apparent from an inspection of the drawings without describing them in detail.

With the lamps 98 and 99 controlled by the fuses in the manner just described, it will be seen that when any one of these fuses becomes blown due to one of the condensers $C^8$ to $C^{19}$, inclusive, becoming short-circuited, the lamps 98 and 99 will become lighted, thereby indicating that one of the condensers has become short-circuited. When the lamps 98 and 99 become lighted, they will subsequently remain lighted until the defective condenser is replaced by a new one and a new fuse is provided in place of the blown fuse.

Although I have herein shown and described only a few forms of power supply units embodying my invention, it is understood that various changes and modifications may be made therein within the scope of the appended claims without departing from the spirit and scope of my invention.

Having thus described my invention, what I claim is:

1. In a power supply unit including a rectifier for supplying rectified direct current to a load from a source of alternating current, and filtering means including a condenser adapted to be connected in parallel with the load, in combination, a fuse comprising two conducting members at least one of which is biased to one position but is held in another position by a fusible member which connects the two members, a contact member adapted to be engaged by said one conducting member when said one conducting member is moved to its one position, means for connecting said condenser in parallel with said load over a circuit including said two conducting members and said fusible member of said fuse, an indication means, and means controlled by the contact formed by said one conducting member and said contact member for connecting said indication means in parallel with said load, whereby if said condenser becomes short-circuited said fusible member will blow and permit said contact to close, thereby interrupting the circuit for the condenser and completing the circuit for the indication means.

2. In combination with a power supply unit including a rectifier for supplying rectified current to a load from a source of alternating current, a plurality of fuses each comprising two conducting members at least one of which is biased to one position but is normally held in another position by a fusible member which connects the two members, a contact member associated with each fuse in such manner that if the one conducting member of the associated fuse moves to its one position it will engage the associated contact member and thereby close a contact comprising the one conducting member and the contact member, a plurality of condensers, means for connecting each of said condensers in parallel with said load over a circuit including the two conducting members and the fusible member of a different one of said fuses, an indication lamp, and a plurality of circuits for connecting said lamp in parallel with said load each including the contact associated with a different one of said fuses.

3. In combination with a power supply unit including a rectifier for supplying rectified direct current from a source of alternating current, a plurality of condensers arranged in groups, the condensers of each group being connected in parallel, a plurality of indicating devices one associated with each group of condensers, a fuse associated with each group of condensers, each said fuse comprising two conducting members each biased to one position but each held in another position by a fusible member which connects the two conducting members, a contact member associated with each fuse and arranged to cooperate with the one conducting member of the associated fuse in such manner that the one conducting member will engage the contact member to close a contact if the one conducting member moves to its biased position; means for connecting the condensers of each group, connected in parallel, in parallel with said load over a circuit including the two conducting members and fusible member of a different one of said fuses; an indication lamp, and a plurality of circuits for said lamp each including the contact associated with a different one of said fuses and each arranged to be supplied with current from the rectifier when the associated contact is closed.

4. In a power supply unit of the type including a transformer secured to a supporting framework, a rectifier secured to said framework and receiving alternating current from said transformer and adapted to supply direct current to a load, and a reactor secured to said framework and adapted to be connected in series with the load, the combination of a pair of spaced terminal blocks secured to said framework, terminal posts mounted in said terminal blocks, a bracket mounted on said terminal posts, two filter condensers disposed on opposite sides of said bracket, lugs secured to each of said condensers and aligning with the lugs secured to the other condenser, and bolts extending through the aligned lugs and said bracket to fasten said condensers to said brackets, said condensers being adapted to be connected in parallel with the load to which current is supplied by the unit to reduce the ripple in the current.

5. A rectifier stack comprising a bolt, an insulating sleeve surrounding said bolt, a plurality of rectifier disks assembled on said sleeve, a thin layer of impressionable conducting material disposed on each side of each disk, a plurality of spacers interposed at intervals in said stack, a plurality of rectangular fins interposed at intervals in said stack, certain of said fins having all four corners cut away and certain other of said fins having only three corners cut away, nuts screwed onto the ends of said bolt to apply pressure to said stack, insulating washers interposed in said stack between said nuts and the adjacent elements of the stack to insulate the elements of the stack from the bolt, said disks being arranged in groups in said stack with the disks of each group all disposed in the same direction and with the disks of opposite groups disposed in opposite directions, and said fins being arranged in said stack in such manner that a fin with only three corners cut away is disposed between each two adjacent groups and at each end of the two end groups, and bus bars disposed at diagonally opposite corners of the fins and extending through holes provided in the remaining corner of those fins which have only three corners cut away and electrically connected with the associated fins at the corners, the bus bars being connected to the fins in such manner that each group of disks provides a current path from the one bus bar to the other bus bar.

6. In a power supply unit in combination, a housing, two spaced brackets mounted in said housing in the same plane, a third bracket mounted in said housing, said third bracket being equally spaced from the other two brackets and being disposed in a plane which is parallel to the other two brackets, a plurality of arms secured to said third bracket by means of stud bolts passing through clearance holes in the associated arm and screwed into tapped holes provided in the bracket, said arms being disposed in spaced pairs with the arms of each pair extending away from each other, each said arm being provided with a hole which aligns with a hole in one or the other of the other two brackets, a plurality of rectifier stacks each including a clamping bolt and each disposed with one end of the associated bolt extending through the hole in a different one of said arms and with the other end of the bolt extending through the hole which aligns with the hole through which the one end of the bolt extends, and nuts screwed onto the ends of said bolts.

7. In a power supply unit in combination, a housing, two spaced brackets mounted in said housing in the same plane, a third bracket mounted in said housing, said third bracket being equally spaced from the other two brackets and being disposed in a plane which is parallel to the other two brackets, a plurality of arms secured to said third bracket by means of stud bolts passing through clearance holes in the associated arm and screwed into tapped holes provided in the bracket, said arms being disposed in spaced pairs with the arms of each pair extending away from each other, each said arm being provided with a hole which aligns with a hole in one or the other of the other two brackets, a plurality of rectifier stacks each including a clamping bolt and each disposed with one end of the associated bolt extending through the hole in a different one of said arms and with the other end of the bolt extending through the hole which aligns with the hole through which the one end of the bolt extends, nuts screwed onto the ends of said bolts, and a plurality of members, one mounted on the bolt of each of said stacks at the end adjacent the associated arm and each provided with a lug which extends through a hole provided in the associated arm, whereby the stacks are prevented from turning relative to the brackets.

8. In a power supply unit in combination, a housing, two spaced brackets mounted in said housing in the same plane, a third bracket mounted in said housing, said third bracket being equally spaced from the other two brackets and being disposed in a plane which is parallel to the other two brackets, a plurality of arms secured to said third bracket by means of stud bolts passing through clearance holes in the associated arm and screwed into tapped holes provided in the bracket, said arms being disposed in spaced pairs with the arms of each pair extending away from each other, each said arm being provided with a hole which aligns with a hole in one or the other of the other two brackets, a plurality of rectifier stacks each including a clamping bolt and each disposed with one end of the associated bolt extending through the hole in a different one of said arms and with the other end of the bolt extending through the hole which aligns with the hole through which the one end of the bolt extends, nuts screwed onto the ends of said bolts, a plurality of members, one mounted on the bolt of each of said stacks at the end adjacent the associated arm and each provided with a lug which extends through a hole provided in the associated arm, an insulating plate interposed between each arm and the associated stack and provided with a hole which receives the bolt of the associated stack and with a hole which receives the lug on the member which is secured to the associated stack, whereby said plate is held in a fixed position, and bus bars associated with each stack for making connection with the stack and each having one end extending through a hole in the associated insulating plate to facilitate the making of electrical connections to the bus bars and to maintain the bus bars in fixed positions.

9. In combination, a housing comprising a rectangular framework and panels removably secured to the top, back, sides, and front of said framework, whereby all parts of the interior of said housing are accessible, two spaced brackets secured to said framework in the same plane, a third bracket secured to said framework, said third bracket being equally spaced from the other two brackets and being disposed in a plane which is parallel to the plane of the other two brackets, a plurality of arms removably secured to said third bracket in pairs at spaced intervals with the two arms of each pair extending in opposite directions from the associated bracket, each said arm being provided with a hole which aligns with a hole provided in one or the other of the other two brackets, a plurality of rectifier stacks each including a clamping bolt, and each having one end of the associated bolt extending through the hole in a different one of said arms and the other end of the associated bolt extending through the hole which aligns with the hole through which the one end of the bolt extends, and nuts screwed onto the ends of said bolts, whereby ready access to the stacks may be had by removing the panels from the housing and any one of the stacks may be removed from the housing without disturbing the other stacks by merely removing the arm to which the associated stack is fastened from the associated bracket and unscrewing the nut from the associated bolt at the end of the stack opposite to the arm.

10. In combination with a rectifier stack mounted on a bolt and provided with bus bars for conducting current to and away from the stacks, a supporting member provided with a hole which receives one end of the bolt, a nut screwed onto the bolt to fasten the stack to the member, a second member secured to the bolt and provided with a lug which projects through a hole in the member, and an insulating plate interposed between the supporting member and the second member and provided with a first hole which receives the bolt and with a second hole which receives the lug on said second member, and with other holes each of which receives one end of one of said bus bars.

REID B. McKINLEY.